UNITED STATES PATENT OFFICE.

FREDERICK B. LA FORGE, OF WASHINGTON, DISTRICT OF COLUMBIA.

PROCESS OF MANUFACTURING GLUCOSE.

1,288,429. Specification of Letters Patent. Patented Dec. 17, 1918.

No Drawing. Application filed April 13, 1918. Serial No. 228,387.

(DEDICATED TO THE PUBLIC.)

*To all whom it may concern:*

Be it known that I, FREDERICK B. LA FORGE, a citizen of the United States of America, and an employee of the Department of Agriculture of the United States of America, residing at Washington, D. C., (whose post-office address is Department of Agriculture, Washington, D. C.,) have invented a new and useful Process of Manufacturing Glucose.

This application is made under the Act of March 3, 1883, chapter 143 (22 Stat. 625), and the invention herein described and claimed may be used by the Government of the United States, or any of its officers or employees, in the prosecution of work for the Government, or any person in the United States, without payment to me of any royalty thereon.

In the practice of my invention corn cobs are subjected to hydrolysis with a sufficient quantity of dilute sulfuric acid, preferably 1 to 2%, until all or most of the pentose-yielding substances have been dissolved therefrom. The undissolved solid material is washed with water until free from acids and all soluble matter. The resulting product is then dried, finely ground, mixed intimately with about an equal weight of 75% sulfuric acid, and the resulting mixture is allowed to stand several hours at ordinary temperature. This mixture is then heated with a large quantity of water until hydrolysis is complete. The solution is then removed by filtration or otherwise from the material which has not been dissolved during the above process, and the acid is removed from the above solution by addition of slaked lime and filtration from the resulting calcium sulfate. This solution is then concentrated to a syrup from which glucose separates in crystalline form, and which may be used for the same purpose as glucose made by other processes and from other materials.

The following experiment in producing glucose by the foregoing process may serve as a guide in carrying out the within described process:

One hundred grams of the above described finely ground and dried residue from corn cobs are intimately mixed with an equal weight of about 75% sulfuric acid. After standing for about ten hours the resulting mass is thoroughly mixed with about one liter of water and the whole is heated for two hours at its boiling point. The undissolved solid material is then removed from the solution by filtration and the solution containing the acid and glucose is neutralized by addition of slaked lime. The resulting calcium sulfate is removed from the sugar solution by filtration or by means of a centrifuge and the resulting solution which finally has a volume of about two liters due to washing operations is concentrated in vacuum to a syrup which yields about 50 grams of crystalline glucose.

Instead of isolating the glucose in crystalline form as above, its solution may be fermented with yeast for the production of alcohol.

Having thus described my invention, I claim:

The process of making glucose from corn cobs by subjecting corn cobs to hydrolysis with dilute sulfuric acid to effect the recovery of the undissolved solid material, which said material is washed free from acids and soluble matter, and is then dried, finely ground, mixed with about an equal weight of 75% sulfuric acid and allowed to stand several hours, after which it is heated with a large quantity of water until hydrolysis is complete and is then treated, preferably by filtration, to remove the solution from which the acid is removed by the addition of slaked lime and filtration from the resulting calcium sulfate, the resulting solution being concentrated to a syrup from which glucose separates in crystalline form.

In testimony whereof, I affix my signature in the presence of two subscribing witnesses.

FREDERICK B. LA FORGE.

Witnesses:
ARTHUR J. DECKER,
L. S. HULBERT.